(No Model.)
W. T. BLACK.
PASTRY BOARD.
No. 331,029. Patented Nov. 24, 1885.
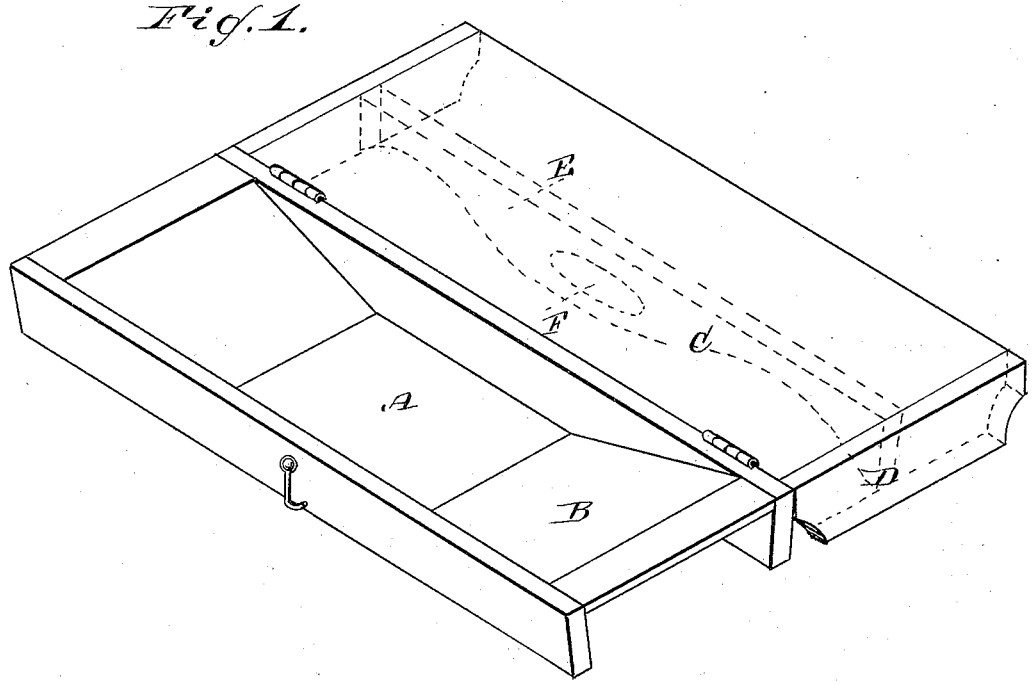
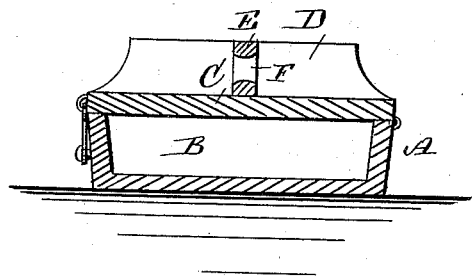
WITNESSES:
Theo. G. Hoster
C. Sedgwick
INVENTOR:
W. T. Black
BY Munn & Co.
ATTORNEYS.

UNITED STATES PATENT OFFICE.

WILLIAM T. BLACK, OF GRAHAM, MISSOURI.

PASTRY-BOARD.

SPECIFICATION forming part of Letters Patent No. 331,029, dated November 24, 1885.

Application filed September 10, 1885. Serial No. 176,730. (No model.)

*To all whom it may concern:*

Be it known that I, WILLIAM T. BLACK, of Graham, in the county of Nodaway and State of Missouri, have invented a new and useful Improvement in Dough Boards and Trays, of which the following is a full, clear, and exact description.

The object of my invention is to provide a new and improved dough board and tray the cover of which when swung down is used as a dough-board and the tray or box itself as the mixer.

The invention consists in the construction and combination of parts and details, as will be fully described and set forth hereinafter.

Reference is to be had to the accompanying drawings, forming a part of this specification, in which similar letters of reference indicate corresponding parts in both the figures.

Figure 1 is a perspective view of my improved dough board and mixer, the same being opened ready for making dough. Fig. 2 is a cross-sectional elevation of the same closed.

The flat box A, having slightly-beveled sides and beveled ends B, is provided with the cover C, hinged to one side piece, which cover is provided on its upper surface with a cross-piece or transverse cleat or ledge, D, at each end, the height of said ledges being equal to the height of the box A. The box and cover have a suitable latch or fastening device for locking them together.

The dough is mixed in the box, and then worked, kneaded, &c., on the inner surface of the cover C, the said cover being swung down and resting on the ledges or cleats D, as shown in Fig. 1.

When the bread is baked, it is placed into the box, which is closed by swinging the cover C on it, the box A thus having the double function of a bread mixer and kneader and a bread box or tray.

The cross-pieces D are united by a bar, E, having an opening, F, which bar serves as a handle for carrying the device.

Having thus fully described my invention, I claim as new and desire to secure by Letters Patent—

The herein-described combined dough board, mixer, and bread-tray, consisting of a box having a hinged cover, which cover is provided on its upper surface with cleats, ledges, or projections of the same height as the box, which cleats or projections are united by a handle-piece extending lengthwise over the cover, substantially as set forth.

WILLIAM T. BLACK.

Witnesses:
H. F. STARKS,
W. P. BLACK.